Nov. 16, 1926.
O. W. YOUNG
1,607,381
THREE-CYLINDER VALVE GEAR
Filed July 9, 1925   5 Sheets-Sheet 3
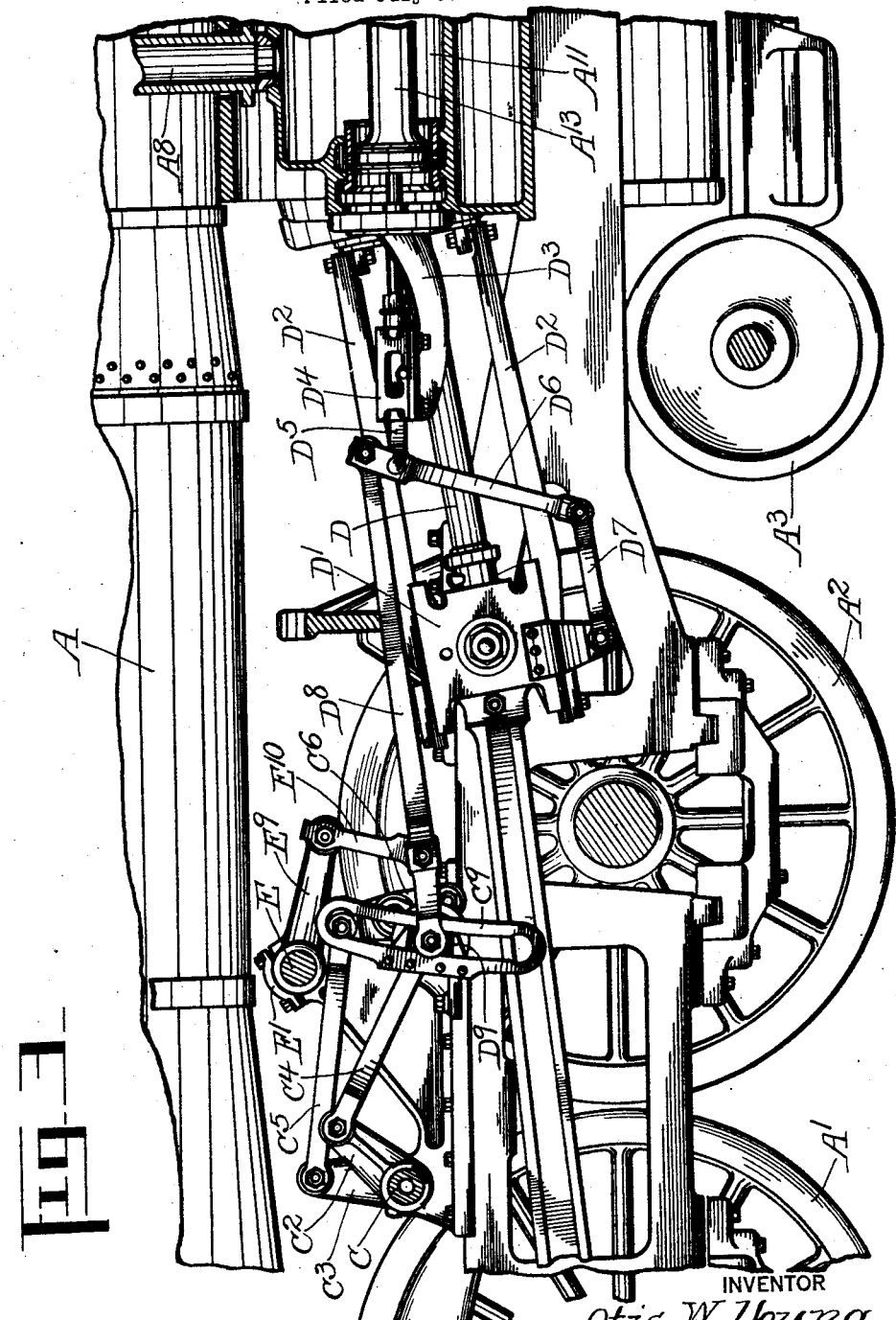
INVENTOR
Otis W. Young.
BY
Parker & Carter
ATTORNEY

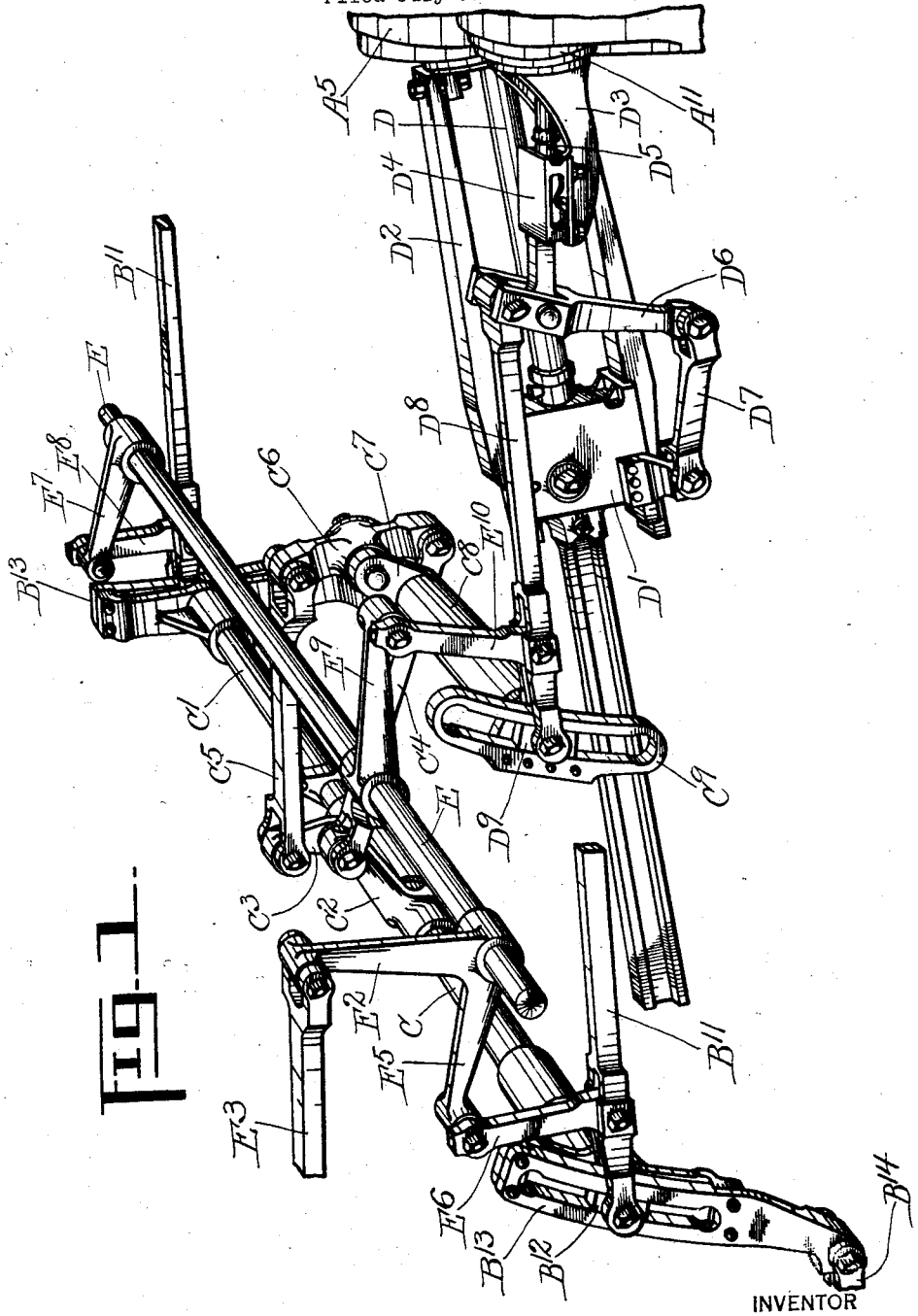

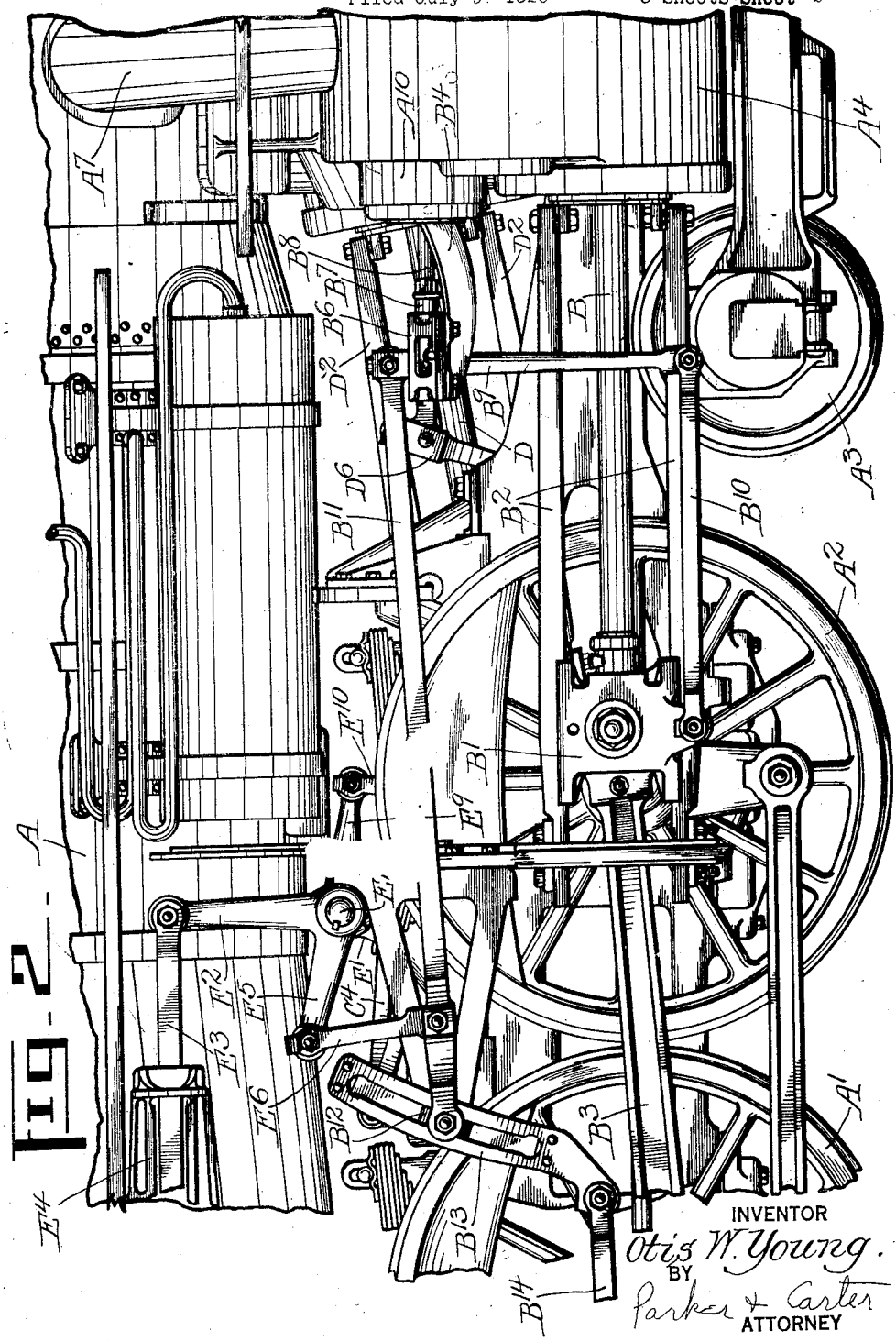

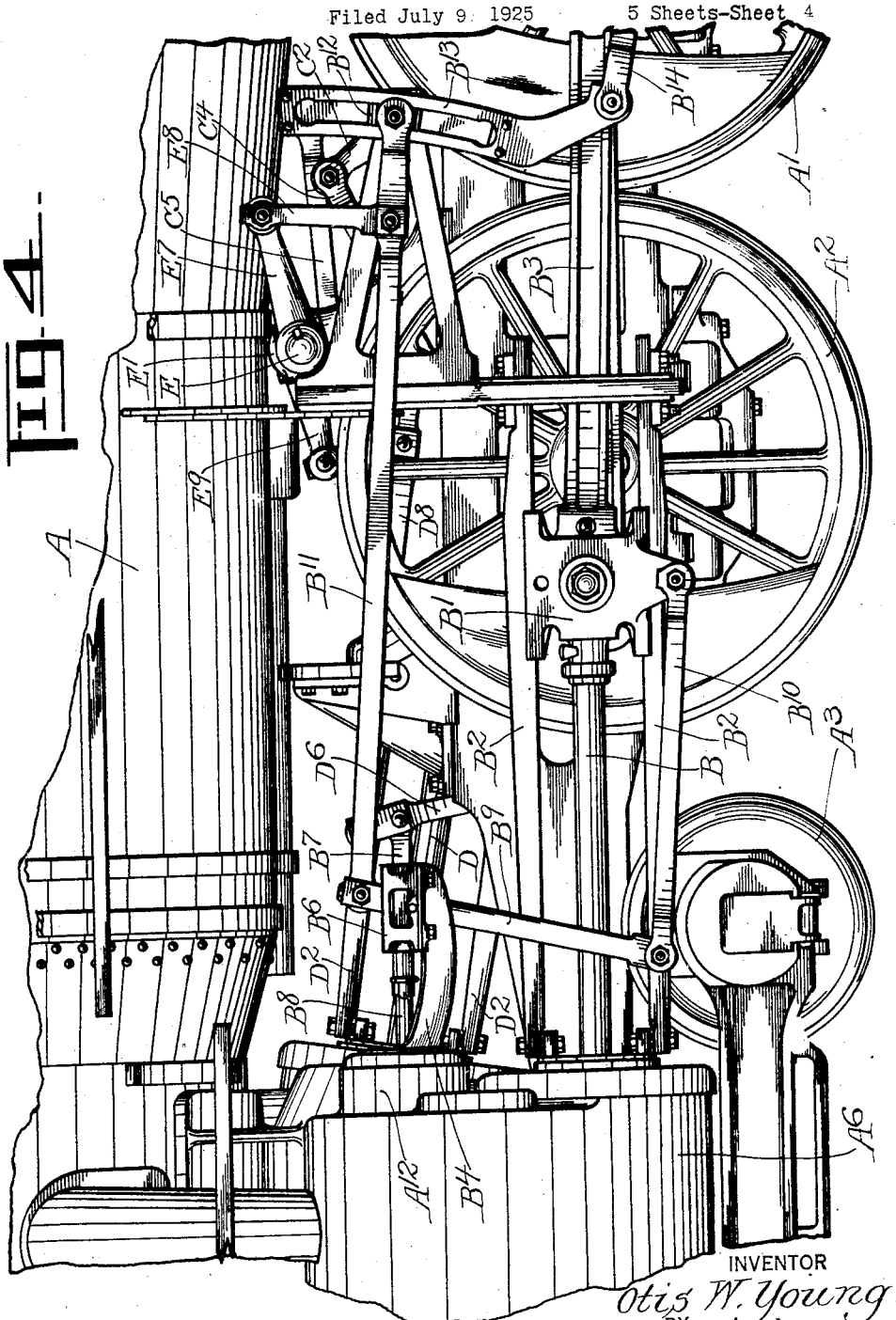

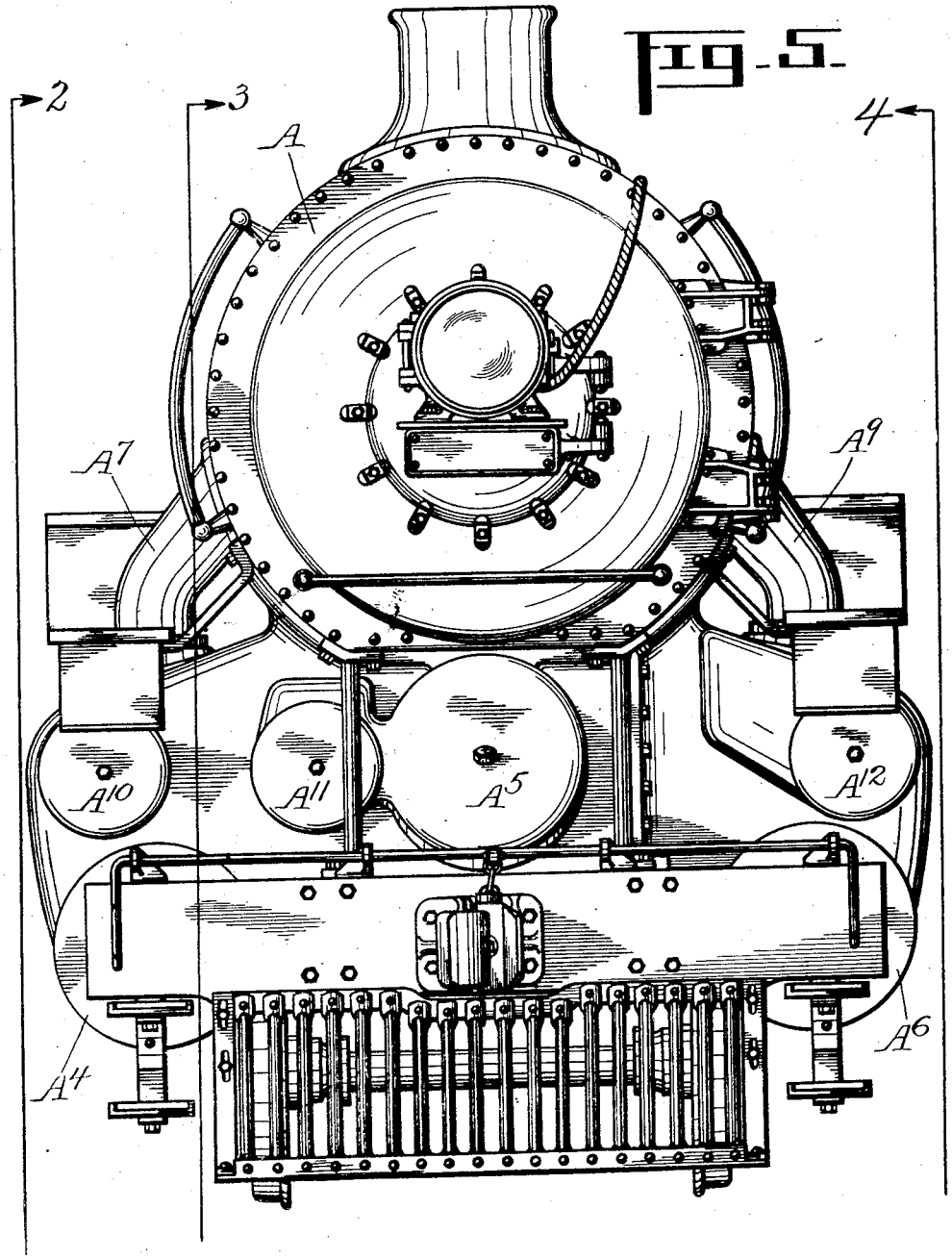

Patented Nov. 16, 1926.

1,607,381

UNITED STATES PATENT OFFICE.

OTIS W. YOUNG, OF CHICAGO, ILLINOIS, ASSIGNOR TO THE PYLE-NATIONAL COMPANY, OF CHICAGO, ILLINOIS, A CORPORATION OF NEW JERSEY.

THREE-CYLINDER VALVE GEAR.

Application filed July 9, 1925. Serial No. 42,357.

My invention relates to improvements in valve gears for three-cylinder locomotive engines, and has for one object to provide a new and improved valve gear whereby the central or third cylinder may be controlled and its timing motions given from the valve gears controlling the outside engines. Other objects will appear from time to time in the specification.

My invention is illustrated more or less diagrammatically in the accompanying drawings, wherein—

Figure 1 is a perspective view of the third cylinder valve gear and associated parts;

Figure 2 is a side elevation of the right-hand side of the locomotive, viewed in the direction of the arrow 2 of Fig. 5;

Figure 3 is a section along the line 3—3 of Fig. 5, showing parts in elevation and illustrating the third cylinder and its associated parts;

Figure 4 is a view of the left-hand side of the locomotive, taken in the direction of the arrow 4 of Fig. 5, and Figure 5 is a front elevation.

A is a locomotive boiler of the usual type, carried on drive wheels $A^1$, $A^2$ and pilot wheels $A^3$. $A^4$, $A^5$, $A^6$ are the cylinders fed with steam through the steam pipes $A^7$, $A^8$, $A^9$. $A^{10}$, $A^{11}$, $A^{12}$ are the valve housings. $A^{13}$ is the piston valve for the center cylinder $A^5$.

The valve mechanism for the two outside cylinders or engines is the standard Walshaert valve gear. A description of one of these engines will suffice for both.

B is the piston rod. It drives a cross-head $B^1$ traveling in the cross-head guides $B^2$. $B^3$ is a connecting rod leading from the cross-head to the drive wheel $A^1$. $B^4$ is a valve cross-head bracket; it carries the valve cross-head guide $B^6$, in which travels the valve cross-head $B^7$. $B^8$ is the valve stem leading from the cross-head to and operating the valve. $B^9$ is the lap and lead lever pivoted on the cross-head $B^7$. $B^{10}$ is the lap and lead lever connector pivoted at one end on the end of the lap and lead lever $B^9$ and at the other end on the engine cross-head $B^1$. $B^{11}$ is the radius rod pivoted at one end on the upper end of the lap and lead lever and at the other end on a block $B^{12}$ slidable in the link $B^{13}$. The link $B^{13}$ is mounted for oscillation, as will hereafter appear, and is pivoted at its lower end to the eccentric rod $B^{14}$, which in turn is pivoted on an eccentric crank, not here shown but associated with one of the drive wheels, so that as the drive wheels rotate the engine cross-head gives the lap and lead lever an oscillatory motion about its pivot point on the valve stem cross-head and the eccentric crank gives the link an oscillatory movement, and, if the block carrying the end of the eccentric rod is removed from the center of rotation of the link, the eccentric rod will be reciprocated, thus changing the pivot point of the upper end of the lap and lead lever. The combination of the two movements given the lap and lead lever by the eccentric rod and the lap and lead lever connector gives the valve movement.

Each of the two outside links—there being one associated with each outside engine—has mounted or aligned cross shafts $C$, $C^1$, and these shafts rotate with the reversing links, being suitably located on bearings on the locomotive frame. $C^2$ is a lever arm projecting laterally from the shaft $C$, and $C^3$ an arm projecting from the shaft $C^1$. Links $C^4$ and $C^5$ are pivoted on these arms $C^2$ and $C^3$ at one end and at the other end on a tumbling lever $C^6$, so that the different oscillatory movements of the two outer reverse links give a motion to the tumbling lever $C^6$. This lever is pivoted on an arm $C^7$ which projects laterally from the shaft $C^8$, which shaft carries and oscillates the third cylinder reversing link $C^9$.

The third cylinder in this particular instance is slightly inclined. It has the piston rod $D$, the cross-head $D^1$ traveling in the inclined cross-head guides $D^2$. A valve stem cross-head guide bracket $D^3$ carries the valve stem cross-head guide $D^4$, the valve stem cross-head $D^5$, and a lap and lead lever $D^6$ is pivoted on the valve stem cross-head $D^5$. $D^7$ is a lap and lead lever connector pivoted on the lap and lead lever and the cross-head $D^1$; $D^8$ a radius rod pivoted at one end on the lap and lead lever $D^6$, at the other end on the block $D^9$ in the link $C^9$.

E is a reverse shaft. It extends clear across the engine, being mounted in bearings $E^1$. At one end this reversing shaft has a lever $E^2$ associated, by means of a link $E^3$, with the power reverse gear $E^4$, whereby the reversing or lift shaft can be rotated. $E^5$ is a lifting arm mounted on the reversing shaft and carrying a radius rod hanger $E^6$, which supports the radius rod $B^{11}$ for the right-hand engine. $E^7$ is a lifting arm on the other end of the reverse shaft, supporting, by means of a radius rod hanger $E^8$, the radius rod for the left-hand engine; and $E^9$ is a lifting arm supporting, by means of a radius rod hanger $E^{10}$, the radius rod $D^8$ for the central engine.

It will be noted that the lift arms for the two outside engines are so related with the lift arm for the central engine or cylinder that when the outer radius rods are lowered the central one is raised, and vice versa. Preferably the valve gears are so related as to space them 120°. Thus one engine is always in different phase from each of the other two by an angular separation of 120°.

Each engine lap and lead lever is given two movements for valve control. In connection with the outside engines the movements come from the cross-head of each engine, and from the eccentric crank. In the center or inside engine the movement comes from the cross-head, and from a combination of the two movements set up by each of the two outside eccentric cranks, and the only relation, then, between the inside engine and the outside engines is through the tumbling lever and the two connecting arms associated with the links.

The reversing shaft changes the point of cut off and valve opening for forward and reverse movement by changing the point at which on the reversing link the movement is taken. The further from the center of rotation the movement is taken, the greater the valve movement. When in the upper position for the outside engines and the lower position for the center engine, the locomotive moves forward; when in the opposite direct position, it moves in the reverse.

While I have shown in my drawings an operative device, nevertheless changes might be made, both in size, shape and dimensions and arrangement of parts, without departing materially from the spirit of my invention.

In this instance then the two outside cylinders and their valves are mounted for travel in parallel lines, this being normal conventional practice but in order to get room for the structure and in order to enable the connecting rod of the central or third cylinder to clear the axle of the front driving wheel, the central cylinder is raised above the other two and downwardly inclined instead of being horizontal and in this instance the valve for the central cylinder has a generally horizontal movement and is generally inclined to the movement of the piston itself.

I claim:

1. A valve gear for three cylinder engines including two reversing links, rock shafts upon which they are mounted having rock arms projecting therefrom, a third reversing link, a rock shaft upon which it is mounted, a rock arm projecting therefrom, and a tumbling lever pivoted on said arm, link connections between each of the first rock arms and opposite ends of the tumbling lever and means for separately driving the first two reversing links.

2. A valve gear for three cylinder engines including two reversing links, rock shafts upon which they are mounted having rock arms projecting therefrom, a third reversing link, a rock shaft upon which it is mounted, a rock arm projecting therefrom, and a tumbling lever pivoted on said arm, link connections between each of the first rock arms and opposite ends of the tumbling lever and two eccentric cranks and driving connections between each of them and one of the first reversing links.

3. A valve gear for three cylinder engines including two reversing links adapted to oscillate about the same axis, rock shafts upon which they are mounted having rock arms projecting therefrom, a third reversing link adapted to oscillate about a different axis, a rock shaft upon which it is mounted, a rock arm projecting therefrom, and a tumbling lever pivoted on said arm, link connections between each of the first rock arms and opposite ends of the tumbling lever and means for separately driving the first two reversing links.

4. A valve gear for three cylinder engines including two reversing links, rock shafts upon which they are mounted having rock arms projecting therefrom, a third reversing link, a rock shaft upon which it is mounted, a rock arm projecting therefrom, and a tumbling lever pivoted on said arm, link connections between each of the first rock arms and opposite ends of the tumbling lever and means for separately driving the first two reversing links, three lap and lead levers and a driving connection between each reversing link and one of said levers.

5. A valve gear for three cylinder engines including two reversing links adapted to oscillate about the same axis, rock shafts upon which they are mounted having rock arms projecting therefrom, a third reversing link adapted to oscillate about a different axis, a rock shaft upon which it is mounted, a rock arm projecting therefrom, and a tumbling lever pivoted on said arm, link connections between each of the first rock arms and opposite ends of the tumbling lever and means for separately driving the first two reversing links, three lap and lead levers and a driving connection between each reversing link and one of said levers.

6. A valve gear for three cylinder engines including two reversing links, rock shafts upon which they are mounted having rock arms projecting therefrom, a third reversing link, a rockshaft upon which it is mounted, a rock arm projecting therefrom, and a tumbling lever pivoted on said arm, link connections between each of the first rock arms and opposite ends of the tumbling lever and means for separately driving the first two reversing links, three lap and lead levers and a driving connection between each reversing link and one of said levers, said connection comprising radius rods, a reverse shaft, means associated therewith for raising the radius rods connected to the two first reversing links and lowering the rod connected to the third and vice versa.

7. A valve gear for three cylinder engines including two reversing links adapted to oscillate about the same axis, rock shafts upon which they are mounted having rock arms projecting therefrom, a third reversing link adapted to oscillate about a different axis, a rock shaft upon which it is mounted, a rock arm projecting therefrom, and a tumbling lever pivoted on said arm, link connections between each of the first rock arms and opposite ends of the tumbling lever and means for separately driving the first two reversing links, three lap and lead levers and a driving connection between each reversing link and one of said levers.

8. In a three cylinder locomotive, a valve, a lap and lead lever and a reversing link for each cylinder, a driving connection between two of the reversing links and an engine crank and a driving connection between both of said reversing links and the third link, the connection between the two first reversing links and the third comprising shafts mounted for oscillation with said reversing links, arms projecting from said shafts, a tumbling lever mounted for oscillation on the arm carrying the third reversing link and link connection between the said two arms and the ends of the tumbling lever.

9. In a three cylinder locomotive, a valve, a lap and lead lever and a reversing link for each cylinder, a driving connection between two of the reversing links and an engine crank and a driving connection between both of said reversing links and the third link, the connection between the two first reversing links and the third comprising shafts mounted for oscillation with said reversing links, arms projecting from said shafts, a tumbling lever mounted for oscillation on the arm carrying the third reversing link and link connection between the said two arms and the ends of the tumbling lever, all said shafts being parallel.

10. In a three cylinder locomotive, a valve, a lap and lead lever and a reversing link for each cylinder, a driving connection between two of the reversing links and an engine crank and a driving connection between both of said reversing links and the third link, the connection between the two first reversing links and the third comprising shafts mounted for oscillation with said reversing links, arms projecting from said shafts, a tumbling lever mounted for oscillation on the arm carrying the third reversing link and link connection between the said two arms and the ends of the tumbling lever, the shafts associated with the first two reversing links being in the same line and parallel with the third.

Signed at Chicago, county of Cook and State of Illinois, this 1st day of July, 1925.

OTIS W. YOUNG.